US009147900B2

(12) United States Patent
Hashimoto et al.

(10) Patent No.: US 9,147,900 B2
(45) Date of Patent: Sep. 29, 2015

(54) FUEL CELL APPARATUS AND FUEL CELL SYSTEM

(71) Applicant: TOYOTA JIDOSHA KABUSHIKI KAISHA, Toyota-Shi, Aichi-Ken (JP)

(72) Inventors: Takuya Hashimoto, Toyota (JP); Hideki Kubo, Seto (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 14/173,279

(22) Filed: Feb. 5, 2014

(65) Prior Publication Data

US 2014/0154603 A1    Jun. 5, 2014

Related U.S. Application Data

(62) Division of application No. 12/598,572, filed as application No. PCT/JP2008/062249 on Jun. 30, 2008, now abandoned.

(30) Foreign Application Priority Data

Jul. 4, 2007    (JP) ................................. 2007-175968

(51) Int. Cl.
*H01M 8/04*    (2006.01)
(52) U.S. Cl.
CPC ........ *H01M 8/04746* (2013.01); *H01M 8/0441* (2013.01); *H01M 8/04119* (2013.01);
(Continued)

(58) Field of Classification Search
USPC .................. 429/446, 430, 431, 432, 443, 444
See application file for complete search history.

(56) References Cited

U.S. PATENT DOCUMENTS 6,586,123 B1    7/2003    Yi et al.
6,858,340 B2    2/2005    Sugawara et al.
(Continued)

FOREIGN PATENT DOCUMENTS

DE    102 46 168 A1    4/2004
DE    695 33 215 T2    6/2005
(Continued)

OTHER PUBLICATIONS

Freire et al., "Effect of membrane characteristics and humidification conditions on the impedance response of polymer electrolyte fuel cells", Jan. 2001, Journal of Electroanalytical Chemistry, pp. 57-68.*
(Continued)

*Primary Examiner* — Patrick Ryan
*Assistant Examiner* — Julian Anthony
(74) *Attorney, Agent, or Firm* — Kenyon & Kenyon LLP

(57)    ABSTRACT

The present invention reduces deterioration in the output of a fuel cell caused by a high moisture concentration at an oxidant electrode. A control apparatus for a fuel cell comprising an electrolyte membrane, an oxidant electrode provided on one side of the electrolyte membrane, and a fuel electrode provided on the other side of the electrolyte membrane, in which electric power is generated from an oxidant gas supplied to the oxidant electrode and a fuel gas supplied to the fuel electrode, wherein when the current-voltage characteristics of the fuel cell fall below a predetermined reference level, and the electrolyte membrane has not dried beyond a predetermined reference level, the control apparatus executes a control operation that increases the gas pressure at the oxidant electrode.

2 Claims, 6 Drawing Sheets

(52) U.S. Cl.
CPC ...... *H01M8/04298* (2013.01); *H01M 8/04432* (2013.01); *H01M 8/04529* (2013.01); *H01M 8/04559* (2013.01); *H01M 8/04589* (2013.01); *H01M 8/04604* (2013.01); *H01M 8/04753* (2013.01); *Y02E 60/50* (2013.01)

(56) References Cited

U.S. PATENT DOCUMENTS

| | | | |
|---|---|---|---|
| 7,122,263 | B2 | 10/2006 | Imamura et al. |
| 7,585,578 | B2 * | 9/2009 | Yonekura et al. ............ 429/411 |

FOREIGN PATENT DOCUMENTS

| | | |
|---|---|---|
| DE | 10 2004 012 332 A1 | 9/2005 |
| JP | 5-47394 A | 2/1993 |
| JP | 8-167421 A | 6/1996 |
| JP | 2002-352827 A | 12/2002 |
| JP | 2003-308862 A | 10/2003 |
| JP | 2004-127914 A | 4/2004 |
| JP | 2004220794 A | 8/2004 |
| JP | 2006-032092 A | 2/2006 |
| JP | 2007-012548 A | 1/2007 |
| JP | 2007-042305 A | 2/2007 |

OTHER PUBLICATIONS

Office Action issued Mar. 2, 2012 in German Patent Application No. 11 2008 001 711.5 & English translation thereof.
Office Action issued Jul. 3, 2012 in Japanese Patent Application No. 2009-290627 and English translation thereof.
Office Action issued Mar. 30, 2012 in Chinese Patent Application No. 200880020419.6 & English translation thereof.

* cited by examiner

FUEL CELL APPARATUS AND FUEL CELL SYSTEM

This is a divisional of U.S. patent application Ser. No. 12/598,572, filed on 2 Nov. 2009, which is a 371 national phase application of PCT/JP2008/062249 filed on 30 Jun. 2008, claiming priority to Japanese Patent Application No. JP 2007-175968 filed on 04 Jul. 2007, the entire contents of which are incorporated herein by reference.

TECHNICAL FIELD

The present invention relates to a fuel cell control apparatus and a fuel cell system.

BACKGROUND ART

Fuel cells comprising an electrolyte membrane, an oxidant electrode provided on one side of the electrolyte membrane, and a fuel electrode provided on the other side of the electrolyte membrane, wherein electric power is generated from an oxidant gas such as air containing oxygen that is supplied to the oxidant electrode, and a fuel gas containing hydrogen that is supplied to the fuel electrode are already known (for example, see JP H05-47394 A, JP 2004-127914 A, and JP 2004-220794 A).

JP H05-47394 A discloses technology for controlling the water content state of a solid polymer electrolyte of a fuel cell in an optimal state, thereby enabling stable operation of the cell. Specifically, a fuel cell is disclosed in which when the current-voltage characteristics of the fuel cell deteriorate and the conductivity of the solid polymer electrolyte increases, the amount of moisture contained within the supplied reactant gas is reduced, whereas when the current-voltage characteristics of the fuel cell deteriorate and the conductivity of the solid polymer electrolyte is low, the amount of moisture within the reactant gas is increased.

Further, JP 2004-127914 A discloses technology for controlling the pressure difference between the pressure of the oxidant gas and the pressure of the fuel gas in accordance with the result of diagnosing the state of moisture within the fuel cell. Specifically, in JP2004-127914A, when the moisture content is diagnosed as being excessive, the pressure difference is controlled so that the pressure of the fuel gas is increased relative to the pressure of the oxidant gas, and as a result, diffusion of water from the air electrode side to the fuel electrode side is inhibited, thus preventing water accumulation within the electrode region of the fuel electrode. On the other hand, when the moisture content is diagnosed as being insufficient, the pressure difference is controlled so that the pressure of the fuel gas is lowered relative to the pressure of the oxidant gas, and as a result, migration of water from the air electrode side to the fuel electrode side is promoted, enabling water impregnation of the electrolyte membrane to occur rapidly.

Furthermore, JP 2004-220794 A discloses a technology for maintaining the pressure difference between the anode pressure and the cathode pressure at a constant level without the use of an anode pressure sensor or cathode pressure sensor, by using the change in the current-voltage characteristics of the fuel cell caused by excessive or insufficient supply volume or pressure of the hydrogen gas or air. Specifically, JP 2004-220794 A discloses a technique wherein when the actual voltage value is lower than a previously stored standard voltage value that is based on the current-voltage characteristics of the cell, this reduced voltage is corrected by increasing the pressure of the fuel gas or the oxidant gas. This technique utilizes the fact that a judgment as to whether or not the supply of hydrogen or air is insufficient can be made by comparing the actual voltage value with the standard voltage value.

DISCLOSURE OF INVENTION

However, in a fuel cell, if the moisture concentration at the oxidant electrode is high, then a phenomenon wherein water adsorbs to the surface of the catalyst of the oxidant electrode or a phenomenon wherein hydroxyl groups are generated at the surface of the catalyst of the oxidant electrode can occur, and these phenomena cause a deterioration in the activity of the catalyst, resulting in a reduction in the fuel cell output.

None of the above documents discloses any countermeasures for dealing with this type of decrease in the fuel cell output caused by a high moisture concentration at the oxidant electrode.

Accordingly, the present invention provides a fuel cell control apparatus that is capable of reducing any decrease in the fuel cell output caused by a high moisture concentration at the oxidant electrode.

A fuel cell control apparatus according to the present invention is a control apparatus for a fuel cell comprising an electrolyte membrane, an oxidant electrode provided on one side of the electrolyte membrane, and a fuel electrode provided on the other side of the electrolyte membrane, in which electric power is generated from an oxidant gas supplied to the oxidant electrode and a fuel gas supplied to the fuel electrode, wherein when the current-voltage characteristics of the fuel cell fall below a predetermined reference level and the electrolyte membrane has not dried beyond a predetermined reference level, the control apparatus executes a control operation that increases the gas pressure at the oxidant electrode.

In one aspect of the present invention, the control operation described above is achieved by executing a first control sequence that increases the gas pressure at the oxidant electrode following completion of a high-load operation during transition from the high-load operation to a low-load operation.

Further, in another aspect of the present invention, in those cases where the aforementioned first control sequence is unable to satisfactorily reduce the deterioration in the current-voltage characteristics, the control operation described above is achieved by executing a second control sequence that increases the gas pressure at the oxidant electrode prior to the start of a high-load operation during transition from a low-load operation to the high-load operation.

A fuel cell system according to the present invention includes a fuel cell, comprising an electrolyte membrane, an oxidant electrode provided on one side of the electrolyte membrane, and a fuel electrode provided on the other side of the electrolyte membrane, in which electric power is generated from an oxidant gas supplied to the oxidant electrode and a fuel gas supplied to the fuel electrode, and a control apparatus according to one of the above aspects that controls the fuel cell.

According to the present invention, a fuel cell control apparatus can be provided that is capable of reducing any decrease in the fuel cell output caused by a high moisture concentration at the oxidant electrode.

DESCRIPTION OF THE REFERENCE SYMBOLS

Figure 1:
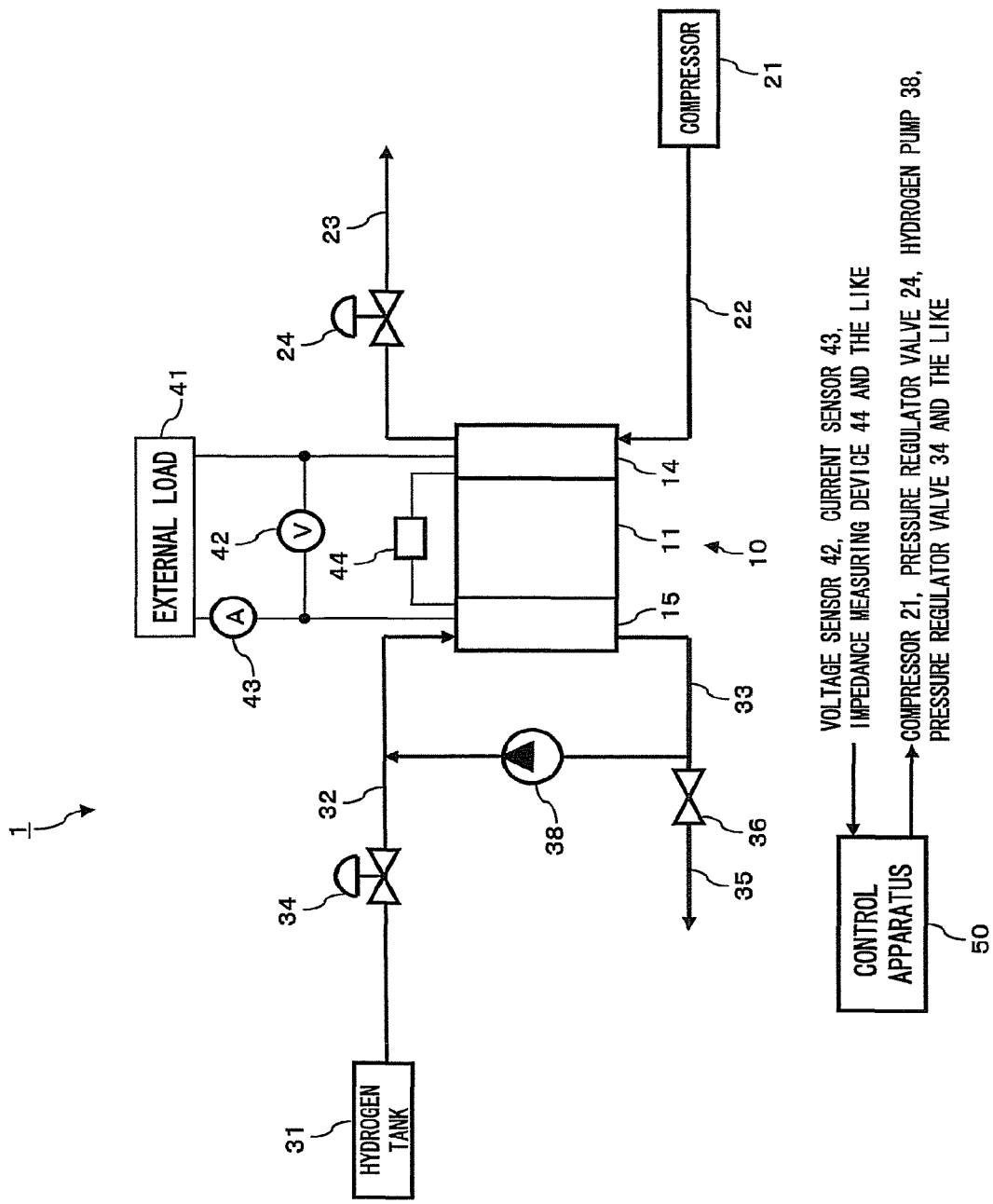
FIG. 1 is a schematic illustration of the structure of a fuel cell system according to the present invention.

1 Fuel cell system
10 Fuel cell
11 Electrolyte membrane
12 Oxidant electrode
13 Fuel electrode
14 Oxidant gas passage
15 Fuel gas passage
16, 17 Diffusion layer
21 Compressor
22 Oxidant supply passage
23 Oxidant discharge passage
24 Pressure regulator valve
31 Hydrogen tank
32 Fuel supply passage
33 Circulation passage
34 Pressure regulator valve
35 Fuel discharge passage
36 Purge valve
38 Hydrogen pump
41 External load
42 Voltage sensor
43 Current sensor
44 Impedance measuring device
50 Control apparatus

BEST MODE FOR CARRYING OUT THE INVENTION

An embodiment of the present invention is described below with reference to the drawings.

FIG. 1 is a schematic illustration of the structure of a fuel cell system 1 according to this embodiment. This fuel cell system 1 is a system for generating electricity using an oxidant gas and a fuel gas, and this particular embodiment is mounted in a fuel cell automobile. The fuel cell system 1 may also be used in applications besides fuel cell automobiles.

In FIG. 1, the fuel cell system 1 includes a fuel cell 10. This fuel cell 10 is supplied with an oxidant gas and a fuel gas, and generates electricity. Specifically, the oxidant gas is a gas that contains oxygen, such as air, and the fuel gas is a gas that contains hydrogen. The fuel cell 10 uses the electrochemical reaction between the hydrogen and the oxygen to generate electricity. The fuel cell 10 is, for example, a solid polymer electrolyte fuel cell.

Figure 2:
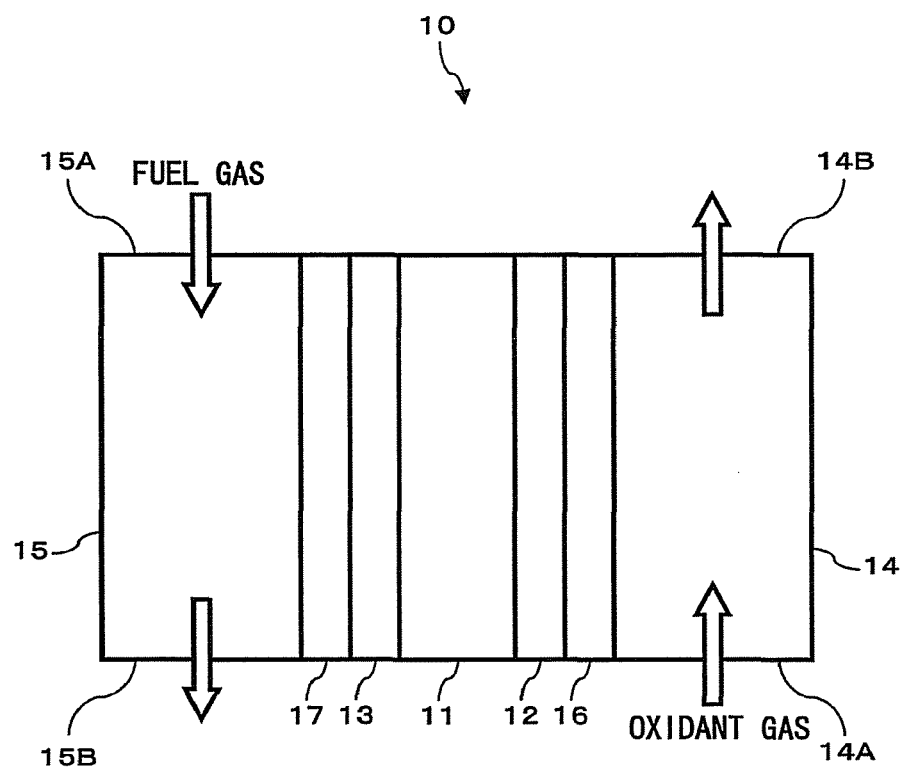
FIG. 2 is a schematic cross-sectional view illustrating the structure of a fuel cell.

FIG. 2 is a schematic cross-sectional view illustrating the structure of the fuel cell 10. A description of the structure of the fuel cell 10 is presented below, with reference to FIG. 2. In this embodiment, the fuel cell 10 has a stacked structure in which a plurality of unit cells are stacked together, but in FIG. 2, for the sake of simplicity, only a single cell is illustrated.

In FIG. 2, the fuel cell 10 comprises an electrolyte membrane 11, an oxidant electrode (known as the cathode) 12 provided on one side of the electrolyte membrane 11, and a fuel electrode (known as the anode) 13 provided on the other side of the electrolyte membrane 11. Specifically, the fuel cell 10 comprises a membrane electrode assembly (MEA) prepared by integrating the electrolyte membrane 11, the oxidant electrode 12, and the fuel electrode 13.

An oxidant gas passage 14 that supplies the oxidant gas to the oxidant electrode 12 is provided along the surface of the oxidant electrode 12 on the outside of the oxidant electrode 12, and a fuel gas passage 15 that supplies the fuel gas to the fuel electrode 13 is provided along the surface of the fuel electrode 13 on the outside of the fuel electrode 13. Specifically, a separator having the oxidant gas passage 14 formed therein is provided on the outside surface of the oxidant electrode 12 with a diffusion layer 16 disposed therebetween, and another separator having the fuel gas passage 15 formed therein is provided on the outside surface of the fuel electrode 13 with a diffusion layer 17 disposed therebetween.

The electricity generating function of the fuel cell 10 is described below. The oxidant gas is supplied to the oxidant gas passage 14 via an inlet 14A, thus supplying the oxidant gas to the oxidant electrode 12. Meanwhile, the fuel gas is supplied to the fuel gas passage 15 via an inlet 15A, thus supplying the fuel gas to the fuel electrode 13. The fuel cell 10 generates electricity using the oxidant gas supplied to the oxidant electrode 12 and the fuel gas supplied to the fuel electrode 13. Specifically, under the catalytic activity of platinum, the reaction represented by equation (1) shown below occurs at the fuel electrode 13, and the reaction represented by equation (2) shown below occurs at the oxidant electrode 12, resulting in the overall electrogenic reaction represented by equation (3) shown below.

$$H_2 \rightarrow 2H^+ + 2e^- \qquad (1)$$

$$2H^+ + (1/2)O_2 + 2e^- \rightarrow H_2O \qquad (2)$$

$$H_2 + (1/2)O_2 \rightarrow H_2O \qquad (3)$$

Thereafter, cathode off-gas is discharged from the oxidant gas passage 14 via an outlet 14B, and anode off-gas is discharged from the fuel gas passage 15 via an outlet 15B.

Referring again to FIG. 1, an oxidant supply passage 22 that channels air supplied from a compressor 21 to the oxidant gas passage 14 is connected to the inlet of the oxidant gas passage 14, whereas an oxidant discharge passage 23 that channels the cathode off-gas discharged from the oxidant gas passage 14 to the outside is connected to the outlet of the oxidant gas passage 14. A pressure regulator valve 24 for regulating the pressure of the gas within the oxidant discharge passage 23 (namely, the cathode back pressure) is provided within the oxidant discharge passage 23. Further, although not illustrated in FIG. 1, the passages 22 and 23 connected to the oxidant gas passage 14 may also be provided with pressure sensors for measuring the gas pressure within the passages, flow rate sensors for measuring the gas flow rate within the passages, valves for closing the passages (air shut-off valves), and humidification modules and the like.

On the other hand, a fuel supply passage 32 that channels hydrogen supplied from a hydrogen tank 31 containing stored high-pressure hydrogen gas to the fuel gas passage 15 is connected to the inlet of the fuel gas passage 15, whereas a circulation passage 33 that returns the anode off-gas discharged from the fuel gas passage 15 to the fuel supply passage 32 is connected to the outlet of the fuel gas passage 15. A pressure regulator valve 34 for regulating the pressure of gas within the fuel supply passage 32 is provided within the fuel supply passage 32. A hydrogen pump 38 for circulating the hydrogen is provided in the circulation passage 33. Furthermore, a fuel discharge passage 35 that channels the anode off-gas discharged from the fuel gas passage 15 to the outside is also connected to the circulation passage 33, and a purge valve 36 for opening and closing the fuel discharge passage 35 is provided in the fuel discharge passage 35. Moreover, although not illustrated in FIG. 1, the passages 32 and 33 connected to the fuel gas passage 15 may also be provided with pressure sensors for measuring the gas pressure within the passages, flow rate sensors for measuring the gas flow rate within the passages, and valves for closing the passages (fuel gas shut-off valves) and the like.

An external load 41 is connected electrically to the fuel cell 10. Examples of the external load 41 include a DC/DC converter, or a load (such as a secondary cell, capacitor, auxiliary or resistor or the like) that is connected to the fuel cell 10 via the DC/DC converter.

Moreover, the fuel cell system 1 also includes a voltage sensor 42 that measures the output voltage of the fuel cell 10, a current sensor 43 that measures the output current of the fuel cell, an impedance measuring device 44 that measures the impedance of the fuel cell 10, and a control apparatus 50 that controls the overall operation of the fuel cell system 1. Specifically, the control apparatus 50 controls the various controlled devices (such as the compressor 21, the pressure regulator valve 24, the hydrogen pump 38, and the pressure regulator valve 34) based on various input information (such as the output values from the voltage sensor 42, the current sensor 43, and the impedance measuring device 44 and the like).

The control apparatus 50 can be realized using a variety of suitable configurations, although in the present embodiment, comprises a CPU (Central Processing Unit), ROM (Read Only Memory), and a main memory and the like. The functionality of the control apparatus 50 is achieved by having the CPU execute a control program stored within a recording medium such as the ROM.

In the structure described above, when the moisture concentration at the oxidant electrode 12 is high, phenomena tend to occur wherein water undergoes physical adsorption to the surface of the catalyst of the oxidant electrode 12, or hydroxyl groups are generated at the surface of the catalyst of the oxidant electrode 12, and these phenomena cause a deterioration in the activity of the catalyst, resulting in a reduction in the output of the fuel cell 10.

This type of event occurs, for example, when the fuel cell is subjected to continuous operation at a low cathode pressure (for example, of not more than 140 kPa abs). Further, this type of event is particularly marked when a low-load operation and high-load operation are conducted repeatedly. Accordingly, in the case of a fuel cell automobile, the above type of phenomena are particularly marked when the states of idle and WOT (Wide Open Throttle) are repeated. Specifically, when a low-load operation and a high-load operation are conducted repeatedly, the output of the fuel cell tends to gradually decrease.

In a case where the current-voltage characteristics of the fuel cell 10 have deteriorated, and the electrolyte membrane 11 is not dry, there is a possibility that the phenomena described above may have caused the decrease in the current-voltage characteristics.

The applicants of the present invention discovered that in those cases where a decrease in the output of the fuel cell is caused by a high moisture concentration at the oxidant electrode 12, the decrease in the output can be reduced (either restored or suppressed) by increasing the gas pressure at the oxidant electrode 12. It is thought that one reason for this effect is that by increasing the gas pressure at the oxidant electrode 12, the water vapor concentration at the oxidant electrode 12 is reduced, and as a result, the amount of water that adsorbs to the catalyst is reduced, water desorption from the catalyst occurs, the generation of hydroxyl groups is suppressed, and desorption of hydroxyl groups' from the catalyst also occurs.

Accordingly, in the present embodiment, in order to address the issue of reduced output from the fuel cell 10 caused by a high moisture concentration at the oxidant electrode 12, the control apparatus 50 executes the control operation described below. Namely, in those cases where the current-voltage characteristics of the fuel cell 10 fall below a predetermined reference level, and the electrolyte membrane 11 has not dried beyond a predetermined reference level, the control apparatus 50 executes a control operation that increases the gas pressure at the oxidant electrode 12.

The meaning of the expression "the current-voltage characteristics of the fuel cell 10 fall below a predetermined reference level" is described below. Specifically, the control apparatus 50 acquires an actual measured value for the current-voltage characteristics of the fuel cell 10, and based on this measured value, determines whether or not the current-voltage characteristics of the fuel cell 10 have fallen below a predetermined reference level. More specifically, the control apparatus 50 compares the measured value for the current-voltage characteristics with a previously stored estimated value for the current-voltage characteristics, and if the difference between the two values is greater than a predetermined threshold, the current-voltage characteristics are deemed to have decreased, whereas if the difference is less than the predetermined threshold, the current-voltage characteristics are deemed to have not decreased. Examples of the measured value of the current-voltage characteristics include an actual measured value for the output voltage at a specific output current, or an actual measured value for the output current at a specific output voltage. The estimated value for the current-voltage characteristics is determined, for example, on the basis of a previously prepared current-voltage characteristics map that is used for determining target values for the output voltage and the output current in accordance with the required output. In the present embodiment, the fall in current-voltage characteristics that represents the target for the determination performed by the control apparatus refers to a decrease in the current-voltage characteristics of the fuel cell 10, and does not refer to decreases in the output voltage or output current caused by a deficiency of the oxidant gas or fuel gas. Accordingly, in this embodiment, the comparison between the actual measured value and the estimated value for the current-voltage characteristics is performed under matching operating conditions for the gas pressures and the flow rates and the like.

The meaning of the above expression "the electrolyte membrane 11 has not dried beyond a predetermined reference level" is described below. Specifically, the control apparatus 50 acquires information representing the state of wetness of the electrolyte membrane 11, and based on that information, determines whether or not the electrolyte membrane 11 has dried beyond a predetermined reference level. For example, the control apparatus 50 may acquire an impedance value for the fuel cell 10, and then determine that the electrolyte membrane 11 is either dry if the impedance is not less than a predetermined value, or not dry if the impedance is less than the predetermined value. The determination as to whether or not the electrolyte membrane 11 is dry may also be performed using a different method.

The meaning of the above expression "executes a control operation that increases the gas pressure at the oxidant electrode 12" is described below. Specifically, when the control apparatus 50 determines that the current-voltage characteristics of the fuel cell 10 have fallen below a predetermined reference level, and that the electrolyte membrane 11 has not dried beyond a predetermined reference level, the control apparatus 50 executes a control operation to increase the gas pressure at the oxidant electrode 12. For example, the control apparatus 50 controls the pressure regulator valve 24 and the compressor 21 so as to increase the gas pressure at the oxidant electrode 12. Here, the "gas pressure at the oxidant electrode 12" specifically describes the pressure of the gas inside the oxidant gas passage 14. Further, the expression "increases the gas pressure at the oxidant electrode 12" means that the gas pressure at the oxidant electrode 12 is increased beyond the gas pressure at the oxidant electrode 12 under normal control conditions. Specifically, the gas pressure is increased relative to a standard gas pressure that is preset in accordance with the target output, such as a gas pressure that is set in accordance with the target output in a previously prepared control map.

Figure 3:
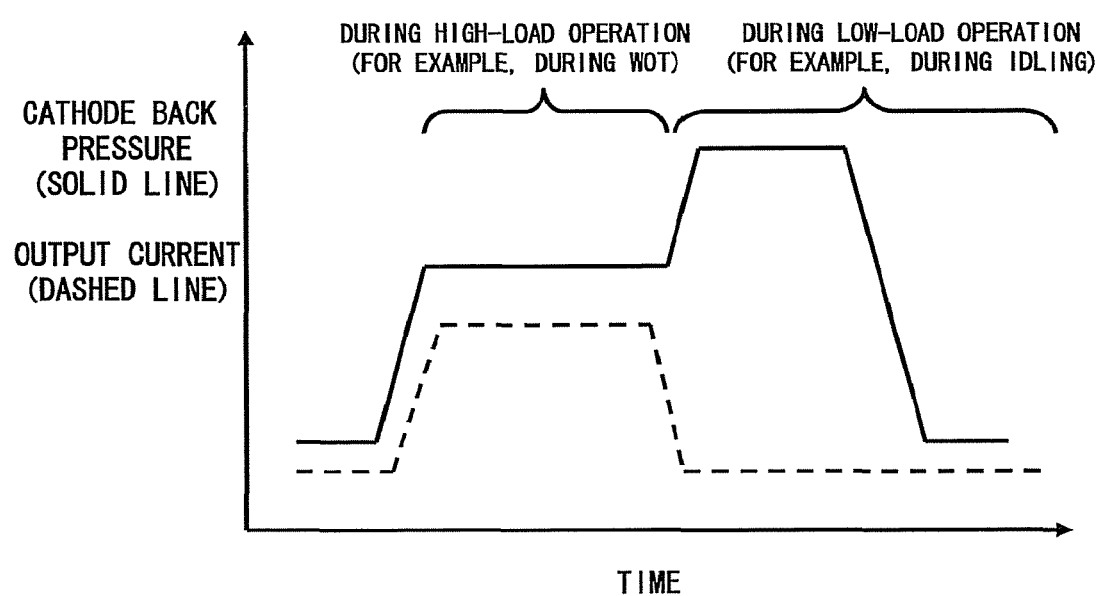
FIG. 3 is a time chart illustrating one example of variation in the cathode back pressure and the output electric current in a first control sequence.

In the present embodiment, from the viewpoint of energy conservation, the control apparatus 50 performs the above control operation by executing a first control sequence that increases the gas pressure at the oxidant electrode 12 following completion of a high-load operation during transition from the high-load operation to a low-load operation. Specifically, as illustrated in FIG. 3, immediately following completion of the high-load operation, the control apparatus 50 temporarily narrows the degree of opening of the pressure regulator valve 24 (or closes the valve in one possible configuration), thereby raising the cathode back pressure. In the case of a fuel cell automobile that represents one possible configuration, when the throttle is closed, the degree of opening of the pressure regulator valve 24 is narrowed for several seconds, thereby temporarily increasing the cathode back pressure during the idling operation or intermittent operation that immediately follows the closing of the throttle.

In those cases where the control apparatus 50 is unable to satisfactorily reduce the decrease in the current-voltage characteristics by executing the above first control sequence, the control operation described above is achieved by executing a second control sequence that increases the gas pressure at the oxidant electrode 12 prior to the start of a high-load operation during transition from a low-load operation to the high-load operation. This second control sequence is less energy efficient than the first control sequence, but produces a strong effect in terms of reducing the deterioration in the current-voltage characteristics.

The meaning of the above expression "those cases where the control apparatus 50 is unable to satisfactorily reduce the decrease in the current-voltage characteristics by executing the first control sequence" is described below. Specifically, based on a predetermined judgment standard, the control apparatus 50 determines whether or not the decrease in the current-voltage characteristics has been able to be satisfactorily reduced by the first control sequence, and if the determination is made that a satisfactory reduction has not been achieved, the second control sequence is executed. The control apparatus 50 may either execute the second control sequence in those cases where the current-voltage characteristics cannot be satisfactorily restored using the first control sequence, or execute the second control sequence in those cases where deterioration in the current-voltage characteristics cannot be satisfactorily suppressed using the first control sequence. In one possible configuration, the control apparatus 50 may execute the first control sequence in the case where the actual measured value for the current-voltage characteristics falls below the estimated value by more than a predetermined threshold, and then execute the second control sequence if the measured value subsequently falls below the estimated value by more than the predetermined threshold for a second time.

Figure 4:
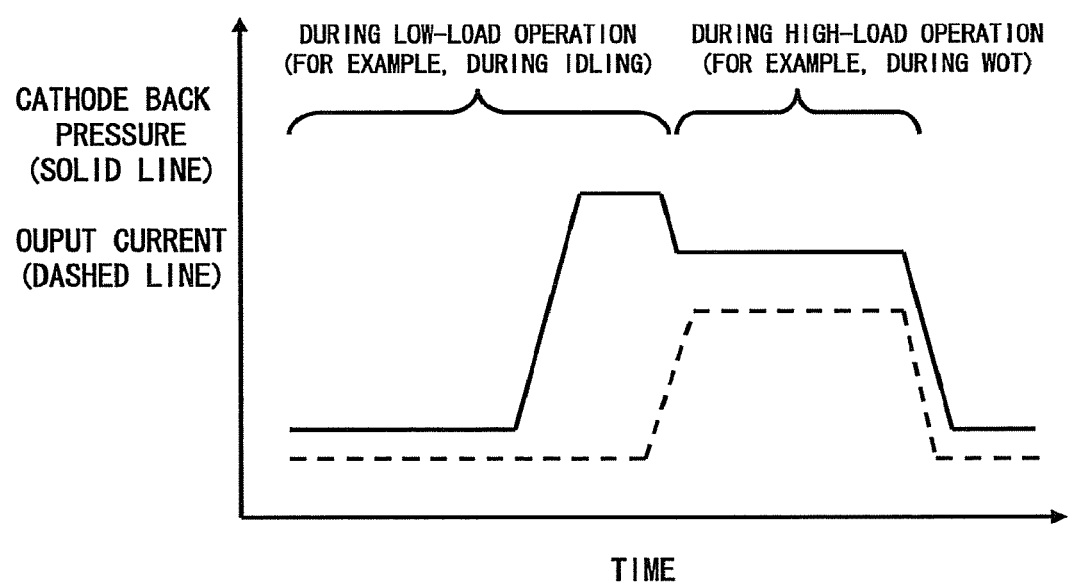
FIG. 4 is a time chart illustrating one example of variation in the cathode back pressure and the output electric current in a second control sequence.

A description of "the second control sequence" is presented below. Specifically, as illustrated in FIG. 4, prior to the start of a high-load operation, for example when a high output is demanded, the control apparatus 50 temporarily narrows the degree of opening of the pressure regulator valve 24 (or closes the valve in one possible configuration), thereby raising the cathode back pressure. In the case of a fuel cell automobile that represents one possible configuration, when the throttle is opened, the degree of opening of the pressure regulator valve 24 is narrowed, thereby temporarily increasing the cathode back pressure.

Figure 5:
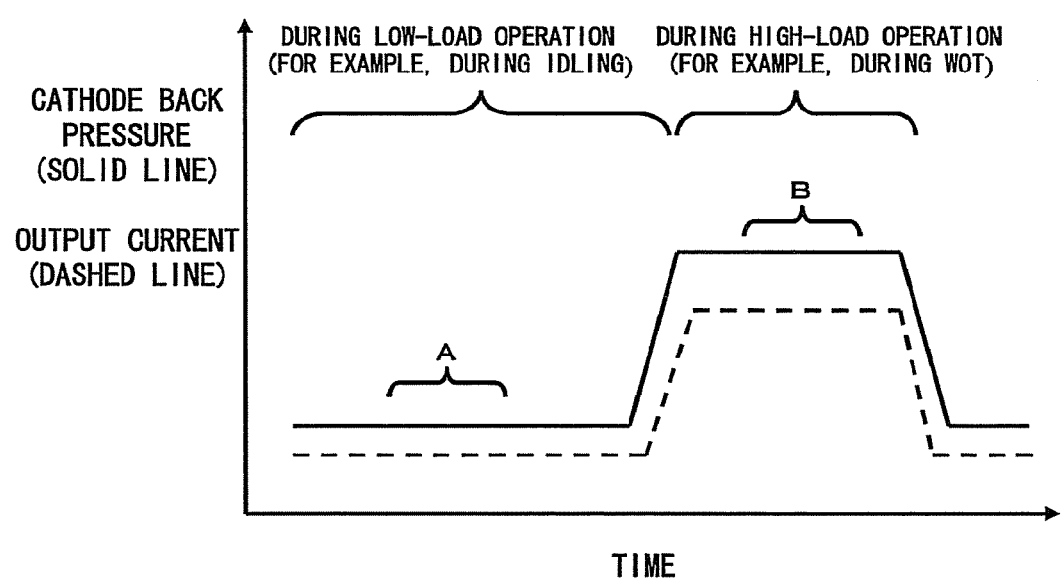
FIG. 5 is a time chart illustrating one example of variation in the cathode back pressure and the output electric current during a low-load operation and a high-load operation.

The timing of the increase in the gas pressure at the oxidant electrode 12 is not restricted to the timing described in the above first control sequence or second control sequence. For example, the gas pressure may also be increased during a low-load operation such as during idling (for example, period A in FIG. 5), or during a high-load operation such as during WOT (for example, period B in FIG. 5).

A description of specific relating to the operation of the fuel cell system 1 according to the present embodiment is presented below.

The control apparatus 50 determines target values for the output voltage and the output current based on a current-voltage characteristics map (I-V characteristics map) for the fuel cell 10 that is set in advance in accordance with the required output. Then, based on a preset control map, the control apparatus 50 determines target values for the pressure and flow rate of the air supplied to the oxidant electrode 12, and the pressure and flow rate of the hydrogen supplied to the fuel electrode 13, in accordance with the determined target values for the output voltage and the output current. The control apparatus 50 then controls the pressure regulator valve 24, the compressor 21, the pressure regulator valve 34, and the hydrogen pump 38 so that the pressure and flow rate of the air supplied to the oxidant electrode 12, and the pressure and flow rate of the hydrogen supplied to the fuel electrode 13 attain their respective target values. In one preferred configuration, pressure sensors are used in adjusting the pressure values to the target values. Further, in another preferred configuration, flow rate sensors are used in adjusting the flow rate values to the target values.

Under the control of the control apparatus 50, hydrogen is supplied from the hydrogen tank 31, through the fuel supply passage 32, to the fuel gas passage 15, and air is supplied from the compressor 21, through the oxidant supply passage 22 to the oxidant gas passage 14, enabling the fuel cell 10 to generate electricity.

The anode off-gas, which includes hydrogen that did not contribute to the reaction, is discharged from the fuel gas passage 15, and this anode off-gas passes through the circulation passage 33 and is re-supplied to the fuel gas passage 15. Because the anode off-gas also includes impurities besides the hydrogen, the hydrogen concentration within the anode off-gas gradually decreases as it is recirculated. Accordingly, the purge valve 36 is opened at an appropriate time, thereby externally discharging the anode off-gas having a reduced hydrogen concentration through the fuel discharge passage 35.

On the other hand, the cathode off-gas is discharged from the oxidant gas passage 14, and this cathode off-gas is then discharge externally through the oxidant discharge passage 23.

Figure 6:
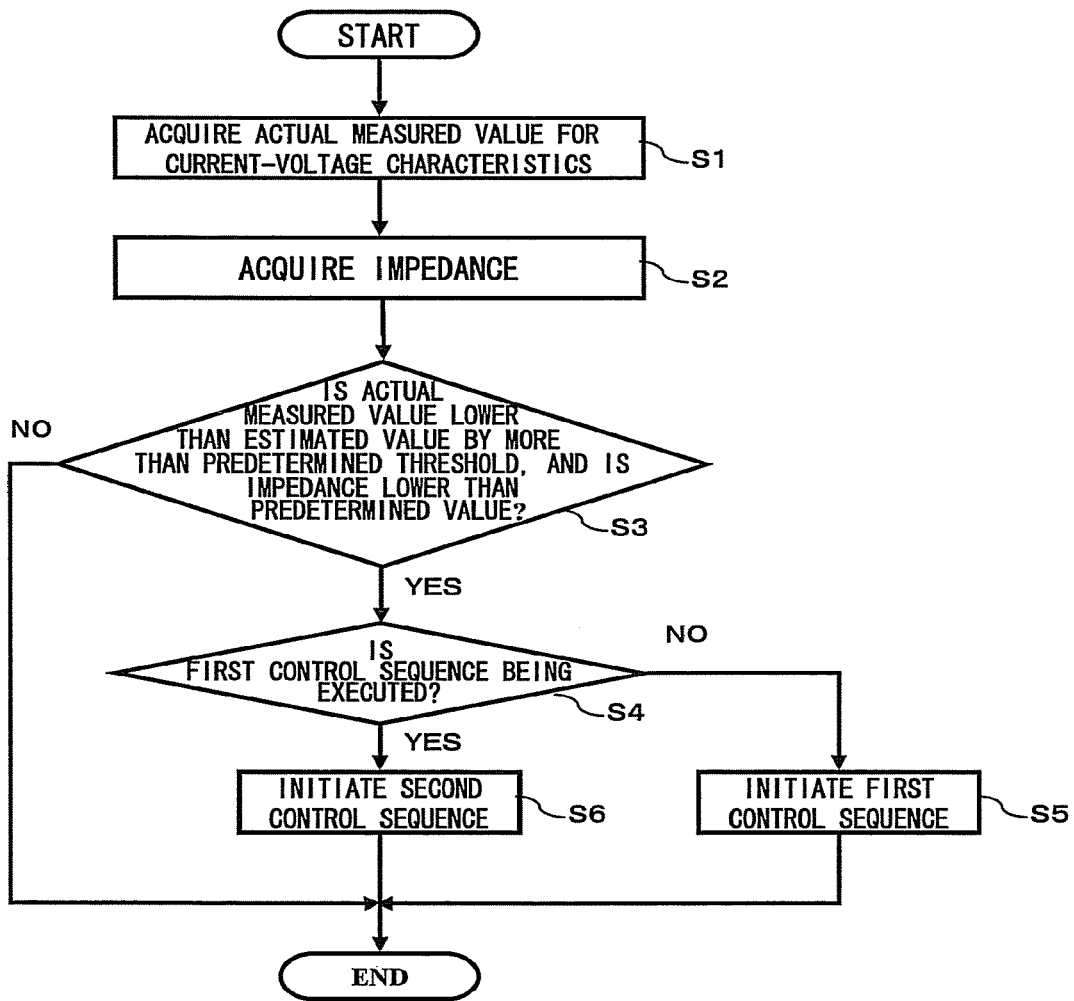
FIG. 6 is a flowchart illustrating the processing executed by a control apparatus.

In the present embodiment, in order to address the issue of reduced output from the fuel cell 10 caused by a high moisture concentration at the oxidant electrode 12, the control apparatus 50 executes the processing outlined in FIG. 6. This processing outlined in FIG. 6 may be repeated as desired.

In FIG. 6, the control apparatus 50 first acquires an actual measured value for the current-voltage characteristics of the fuel cell 10 using the voltage sensor 42 and the current sensor 43 (S1).

Further, the control apparatus 50 also acquires an impedance value for the fuel cell 10, which is measured using the impedance measuring device 44.

Then, the control apparatus 50 determines whether or not the acquired measured value for the current-voltage characteristics is lower than an estimated value by more than a predetermined threshold, and the acquired impedance is less than a predetermined value (S3).

If the result of the determination at step S3 is "NO", then the processing finishes.

On the other hand, if the result of the determination at step S3 is "YES", namely, if a determination is made that the actual measured value is lower than the estimated value by more than the predetermined threshold, and the impedance is less than the predetermined value, then the control apparatus 50 determines whether or not the first control sequence is currently being executed (S4).

If the first control sequence is not currently being executed (S4: NO), then the control apparatus 50 initiates the first control sequence that increases the gas pressure at the oxidant electrode 12 following completion of a high-load operation (S5). Specifically, the control apparatus 50 initiates a control sequence which, immediately following throttle off, temporarily (approximately 20 seconds) closes the pressure regulator valve 24, thereby increasing the cathode back pressure.

On the other hand, if the first control sequence is currently being executed (S4: YES), then the control apparatus 50 initiates the second control sequence that increases the gas pressure at the oxidant electrode 12 prior to the start of a high-load operation (S6). Specifically, the control apparatus 50 initiates a control sequence which, when a high output is demanded, first closes the pressure regulator valve 24, thereby increasing the cathode back pressure.

The first and second control sequences are ended, for example, when the current-voltage characteristics have recovered beyond a predetermined level.

As described above, in the present embodiment, a control operation is executed so that in a fuel cell comprising an electrolyte membrane, an oxidant electrode provided on one side of the electrolyte membrane, and a fuel electrode provided on the other side of the electrolyte membrane, in which electric power is generated from an oxidant gas supplied to the oxidant electrode and a fuel gas supplied to the fuel electrode, when the current-voltage characteristics of the fuel cell fall below a predetermined reference level, and the electrolyte membrane has not dried beyond a predetermined reference level, the gas pressure at the oxidant electrode is increased. As a result, by adopting the present embodiment, the deterioration in the fuel cell output caused by a high moisture concentration at the oxidant electrode can be reduced.

Furthermore, in the present embodiment, the above control operation can be achieved by executing a first control sequence that increases the gas pressure at the oxidant electrode following completion of a high-load operation during transition from the high-load operation to a low-load operation.

Further, in the present embodiment, in those cases where the above first control sequence is unable to satisfactorily reduce the deterioration in the current-voltage characteristics, the above control operation can be achieved by executing a second control sequence that increases the gas pressure at the oxidant electrode prior to the start of a high-load operation during transition from a low-load operation to the high-load operation. By employing this configuration, satisfactory restoration or suppression of any deterioration in the current-voltage characteristics can be achieved even in those cases where the deterioration cannot be satisfactorily restored or suppressed using the first control sequence.

The present invention is not limited by the embodiment described above, and various modifications are possible without departing from the scope of the present invention.

For example, an injector may be provided instead of the pressure regulator valve 34, and the pressure of the fuel gas then regulated by controlling the on-off state of the injector.

The invention claimed is:

1. A method for controlling a fuel cell system comprising a fuel cell, which comprises an electrolyte membrane, an oxidant electrode provided on one side of the electrolyte membrane, and a fuel electrode provided on another side of the electrolyte membrane, in which electric power is generated from an oxidant gas supplied to the oxidant electrode and a fuel gas supplied to the fuel electrode, wherein executing a control operation that increases a gas pressure at the oxidant electrode when current-voltage characteristics of the fuel cell fall below a predetermined reference level, and an impedance of the fuel cell is less than a predetermined value, and the control operation comprises executing a first control sequence that increases a gas pressure at the oxidant electrode following completion of a high-load operation during transition from the high-load operation to a low-load operation, and the control operation comprises executing a second control sequence that increases a gas pressure at the oxidant electrode prior to starting a high-load operation during transition from the low-load operation to the high-load operation.

2. The method according to claim 1, wherein
the control operation comprises narrowing a degree of opening of a pressure regulator valve that regulates a pressure of a cathode off-gas discharged from the oxidant electrode, thereby increasing a gas pressure at the oxidant electrode.

* * * * *